United States Patent
Guazzone

[15] 3,693,803
[45] Sept. 26, 1972

[54] FILTER DEVICE
[72] Inventor: Bruno Guazzone, Rapperswil, Germany
[73] Assignee: Dr. Ing. Hans Muller Chemie-Apparatebau, Zurich, Switzerland
[22] Filed: Nov. 23, 1970
[21] Appl. No.: 92,083

[30] Foreign Application Priority Data
Dec. 1, 1969 Switzerland..........489263/69

[52] U.S. Cl..............................210/330, 210/351
[51] Int. Cl.............................................B01d 33/06
[58] Field of Search......................210/331, 351, 330

[56] References Cited

UNITED STATES PATENTS

| | | | |
|---|---|---|---|
| 2,468,354 | 4/1949 | Abbrecht | 210/350 |
| 3,292,791 | 12/1966 | Muller | 210/330 |

FOREIGN PATENTS OR APPLICATIONS

| | | | |
|---|---|---|---|
| 291,316 | 4/1916 | Germany | 210/331 |
| 352,222 | 5/1905 | France | 210/330 |
| 617,677 | 2/1949 | Great Britain | 210/331 |

*Primary Examiner*—Reuben Friedman
*Attorney*—Michael S. Striker

[57] ABSTRACT

A housing has a peripheral wall provided with an opening in which a shaft is rotatably journalled with an end portion thereof extending through the opening to the exterior of the housing. Disc-shaped filter elements are mounted in axial succession on the shaft for rotation therewith. A sleeve surrounds the end portion of the shaft extending into the interior of the housing where it abuts against a terminal one of the filter elements. The sleeve is slidable axially of the shaft and a pressure-exerting arrangement is provided exteriorly of the housing for exerting pressure on the sleeve in a sense displacing it deeper into the housing and thereby exerting pressure upon and squeezing the filter elements on the shaft.

9 Claims, 1 Drawing Figure

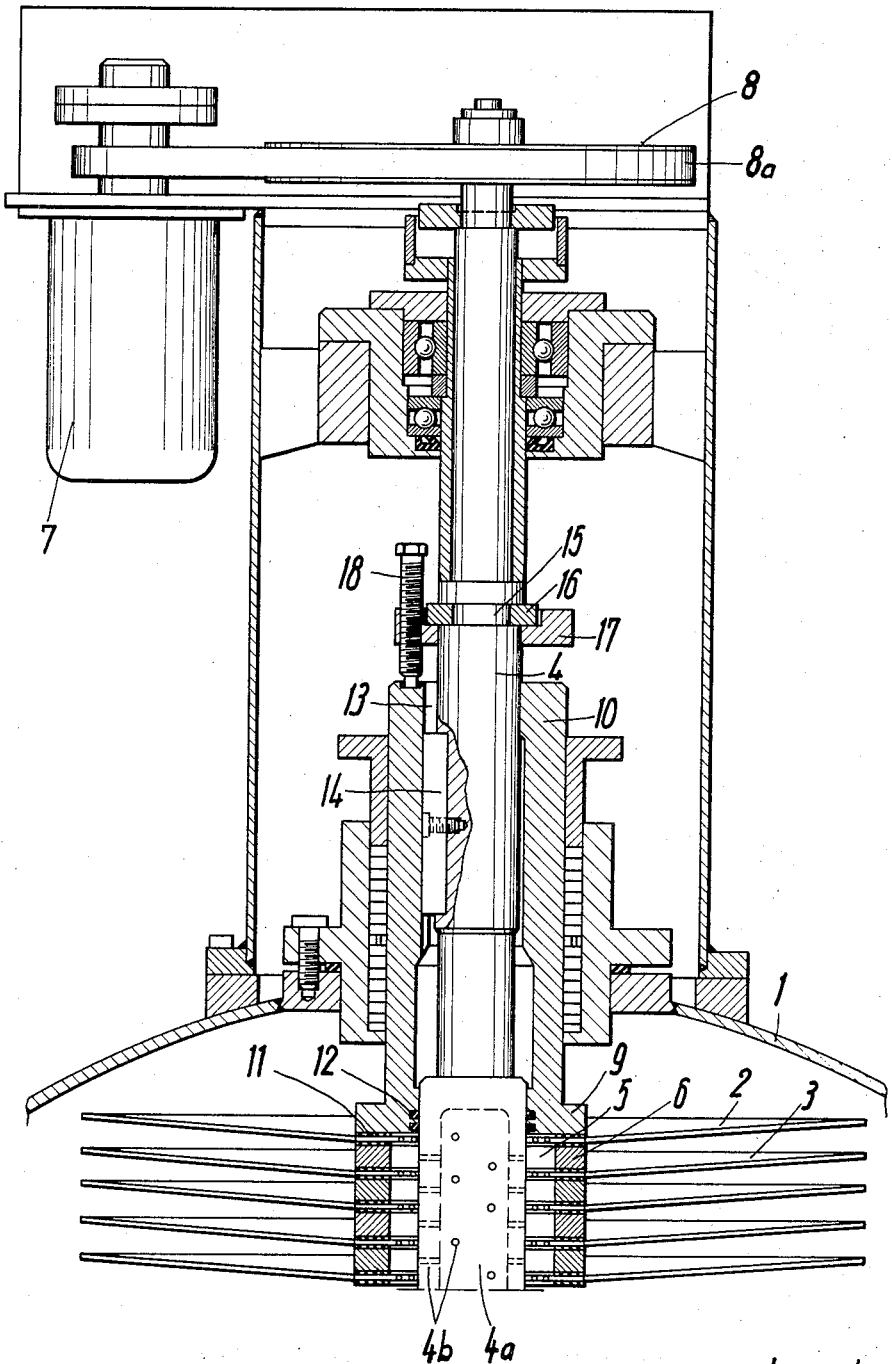
Inventor:
BRUNO GUAZZONE

FILTER DEVICE

BACKGROUND OF THE INVENTION

The present invention relates generally to filter devices, and more particularly to a filter device having a plurality of filter elements and being provided with an arrangement for compressing these filter elements.

It is known, for instance from the prior U.S. Pats. No. 3,292,791 and No. 3,395,801, to provide filter devices in which a rotatable shaft is journalled in a housing and carries a plurality of axially arrayed disc-shaped filter elements extending transversely to the axis of rotation of the shaft. Each of the filter elements has a hub which surrounds the shaft and is connected therewith for rotation with the shaft. The filter elements are hollow and the interior communicates with an interior passage provided in the shaft through which the filtrate flows out of the housing.

Evidently, it is possible for non-filtered liquid from the interior of the housing to pass between the inner surface of the respective hub of a filter element and the outer surface of the shaft, into the opening provided in the shaft which communicates with the interior passage of the latter. Thus, non-filtered liquid could become admixed with the filtered liquid by short-circuiting the filtration path in this manner, and could contaminate the filtrate. To avoid this the hubs of the axially adjacent filter elements must be pressed tightly together to prevent non-filtered liquid from passing between the hubs of adjacent filter elements and from there to pursue the short-circuiting path just described.

Conventionally, the necessary pressure upon the hubs of a stack of filter elements carried on such rotatable shaft is exerted by means of a pressure-exerting device arranged at one axial end of the stack of filter elements on the shaft. Such a device may for instance be in form of one or more screws which are in mesh with tapped bores provided on an element secured against axial displacement on the shaft. After a filter device of this type has been taken apart for cleaning or inspection, the disc-shaped filter elements are placed onto the shaft and then pressure is exerted upon them in a sense axially tightly pressing their hubs together. Now the housing of the filter device is closed and the device is ready for operation.

While the prior-art constructions prevent quite reliably the intrusion of non-filtered liquid into the flow path for the filtrate under normal circumstances, it will be appreciated that the hubs of the filter elements can be subjected to the desired pressure only when the housing of the filter device is open. Thus, if any difficulties arise during the filtration, for instance if the filtrate is suddenly discovered to be turning cloudy, possibly in response to a pressure increase in the housing, then this is frequently an indication that the pressure acting upon the hubs of the filter elements in the sense pressing them tightly and sealingly together is not adequate and must be readjusted. This, however, can be effected only by interrupting the filtration process, opening the housing and obtaining access to the pressure-exerting device which must then be adjusted. Evidently this requires undesirable downtime for the device, may lead to loss of materials and may be dangerous to the operating personnel if the contents of the housing are for instance poisonous, radioactive or readily combustible. This latter problem can be avoided if the contents which might prove dangerous, are first completely removed and the interior of the housing cleaned as by flushing or the like, before the housing is opened; however, it is evident that this requires an additional loss of time and possibly a loss of material.

Evidently, this is not an entirely satisfactory state of affairs. Nevertheless, no improvement avoiding these difficulties has heretofore been forthcoming.

SUMMARY OF THE INVENTION

It is, accordingly, an object of the present invention to overcome the aforementioned disadvantages.

More particularly it is an object of the present invention to provide an improved filter device which is not possessed of these disadvantages.

Still more specifically it is an object of the present invention to provide such a filter device of the type under discussion which permits readjustment of the axial pressure exerted upon the hubs of the filter elements, from the exterior of the housing without having to open the latter or to interrupt the filtration process.

A concomitant object of the present invention is to provide such an improved filter device which, despite the incorporation of the desirable advantages outlined above, is simple and inexpensive in its construction insofar as the improvements are concerned.

In pursuance of the above objects, and others which will become apparent hereafter, one feature of the invention resides in a filter device which, according to one embodiment and briefly stated, comprises a housing having a peripheral wall provided with an opening. A shaft is rotatably journalled in this housing and has an end portion extending through the opening and to the exterior of the housing. A plurality of filter elements is mounted and axially arrayed on the shaft for rotation therewith. Finally, I provide pressure means for subjecting the filter elements to pressure axially of the shaft, such pressure means including a sleeve which slidably surrounds the end portion and which has an outer part located without and an inner part located within the housing with the inner part abutting against the adjacent filter element. An actuating arrangement is located outside the housing and is operable for exerting pressure upon the outer part axially of the shaft in a sense pressing the inner part against the adjacent filter element for transmittal of such pressure to the remaining ones of the filter elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a fragmentary vertical sectional elevation illustrating an embodiment of the present invention.

DESCRIPTION OF THE PREFERRED EMBODIMENTS

Discussing the drawing in detail it will be seen that I have diagrammatically illustrated a cover 1 of a non-illustrated housing. Of course, the cover 1 is a part of the housing and thus may be representative thereof. The particular configuration of the housing is of no importance for an understanding of the present invention, but reference may for instance be had to the aforementioned U.S. Pats. No. 3,292,791 and No. 3,395,801 for information concerning suitable housing configurations.

A shaft 4 is journalled for rotation about its longitudinal axis in the housing and extends through an opening provided for this purpose in the cover 1, with the opening being sealingly closed by a suitable seal, here illustrated as a conventional gland.

As the drawing shows, the shaft 4 is provided with an internal passage 4a which communicates in non-illustrated manner with the exterior of the housing. The shaft 4 is further provided with a plurality of apertures 4b communicating on the one hand with the passage 4a and on the other hand with annular spaces 5 formed between the hubs 6 of axially adjacent ones of the substantially disc-shaped filter elements 2 and 3. The latter are hollow and filtrate passes from them into these spaces 5 and from there via the apertures 4b into the passage 4a.

The device here illustrated is usually so arranged that the axis of the shaft 4 has an upright orientation, as shown. It is therefore the upper end portion of the shaft 4 which passes through the gland to the exterior of the housing diagrammatically represented by the cover 1. In the region of its upper free end that part of the upper end portion of the shaft 4 which is located exteriorly of the housing is provided with a suitable motion-transmitting arrangement, here illustrated in form of a belt pulley 8 about which a drive belt 8a is trained which in turn cooperates with and is driven by a prime mover, here illustrated as an electromotor 7. Thus, the shaft 4 can be rotated via the electromotor 7, the purpose being to rotate the shaft 4 and thereby the filter elements 2, 3 sufficiently rapidly so that the filter cake or residue which remains on the filter elements after filtrations, will be flung off the filter elements in known manner (compare the aforementioned U.S. patents).

The normally lower portion of the shaft 4 is not illustrated but it will be appreciated that it will be provided with a suitable abutment, such as an annular collar or the like, against which the hub 6 of the lower terminal filter element 3 will abut to prevent it from downward axial displacement. The upper terminal filter element is identified with reference numeral 2.

According to the present invention there is provided a sleeve 10 which surrounds in part the upper end portion of the shaft 4 and is partially located within and partially located without the housing. The sleeve 10 also extends through the illustrated gland and has adjacent the terminal filter element 2 a flange-shaped engagement portion 9 which abuts against the hub 6 of the filter element 2 as illustrated. A sealing ring 11 is interposed between the hub 6 of the filter element 2 and the flange portion 9 of the sleeve 10, as illustrated. Additionally, one or more seals 12 in form of O-rings are located in grooves provided for this purpose in the inner circumferential surface of the sleeve 10 and engage the outer surface of the shaft 4 to seal the interior of the sleeve 10 against passage of fluid between the inner surface thereof and the outer surface of the shaft 4.

The outer surface of the shaft 4 is provided with an axial groove and the inner surface of the sleeve 10 is provided with a similar axial groove which are radially aligned with one another. A key in form of an elongated element 14 is located in the two grooves and is connected with the shaft 4 in suitable manner, for instance by means of one or more screws as illustrated. Thus, the key 14 prevents relative rotation of shaft 4 and sleeve 10, but permits sliding displacement of sleeve 10 axially of the shaft 4 without any hindrance. Located exteriorly of the housing adjacent the outer axial end of the sleeve 10 is a stationary member 17 which is mounted on the shaft 4 and provided with a desired number of tapped bores (one shown) which are so located that when bolts or similar externally threaded elements 18 (one shown) are threaded into them, the free ends of the bolts 18 can engage with the adjacent outer axial end face of the sleeve 10, as shown. Member 17 is mounted on the shaft 4 against axial displacement by means of a two-part mounting ring 16 which is in part received in an outer circumferential groove 15 of the shaft 4 and retainingly engages the member 17 to prevent its axial displacement. Turning of the bolts 18 in a sense causing the same to become threaded more deeply into the tapped bores of the member 17, forces their free ends against the sleeve 10, thus displacing the same axially into the housing so that the flange-shaped portion 9 exerts pressure on the hub 6 of the filter element 2 in axial direction of the shaft 4, such pressure being transmitted from the hub 6 of the filter element 2 to the hubs 6 of the various other filter elements 3. Because the pressure is resisted by the aforementioned non-illustrated abutment at the lower end of the stack of filter elements 2, 3, the hubs 6 of all filter elements are tightly pressed against one another and prevent the intrusion of liquid between them into the annular spaces 5.

In the illustrated embodiment the sleeve 10 has an outer surface which is worked to the same specifications as the outer surface of the shaft 4, so that the sleeve 10 is rotatably accommodated in the gland and can rotate with the shaft 4. Thus, the necessary adjustment in the pressure exerted upon the hubs 6 of the filter elements 2, 3 can be made at any time without having to open the housing and without having to interrupt the filtration process.

Furthermore, the arrangement illustrated in the exemplary embodiment of the drawing is such that the entire drive can be readily removed for access to the interior of the housing through the cover 1, for cleaning or repair purposes, or the like. It remains to be pointed out that the gland illustrated could of course also be replaced with other sealing means, including sliding-ring seals or the like. Insofar as in other constructions any sealing components are normally provided on the outer surface of the shaft, they would have to be provided in the illustrated embodiment on the outer surface of the sleeve 10 instead.

It will be understood that each of the elements described above, or two or more together, may also find a useful application in other types of constructions differing from the types described above.

While the invention has been illustrated and described as embodied in a filter device, it is not intended to be limited to the details shown, since various modifications are structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a filter device, in combination, a housing having a peripheral wall provided with an opening; a shaft rotatably journalled in said housing and having an end portion extending through said opening and to the exterior of said housing; rotating means exteriorly of said housing and having a component engaging said end portion of said shaft for rotating the latter; a plurality of filter elements mounted and axially arrayed on said shaft within said housing for rotation with said shaft; and pressure means for subjecting said filter elements to pressure axially of said shaft, said pressure means including a sleeve slidably surrounding said end portion, and having an outer part without said housing intermediate the same and said component of said rotating means, and an inner part within said housing and abutting an adjacent filter element, and an actuating arrangement outside said housing and operable for exerting pressure upon said outer part axially of said shaft in a sense pressing said inner part against said adjacent filter element for transmittal of such pressure to the remaining ones of said filter elements.

2. In a filter device as defined in claim 1, wherein said filter elements are substantially disc-shaped and extend transversely of the axis of said shaft.

3. In a filter device as defined in claim 1; and coupling means coupling said sleeve for rotation with said shaft while permitting axial sliding of said sleeve with reference to said shaft.

4. In a filter device as defined in claim 1; and further comprising sealing means sealing said opening against the passage of fluid past said sleeve.

5. In a filter device as defined in claim 1; and further comprising sealing means sealing the interior of said sleeve against the passage of fluid between said shaft and said sleeve.

6. In a filter device as defined in claim 5, said sealing means comprising at least one sealing element intermediate and in sealing engagement with said sleeve and said one filter element.

7. In a filter device as defined in claim 1, said filter elements being of disc-shaped outline and each having an annular hub surrounding said shaft, and wherein said sleeve comprises an inner annular flange-shaped endportion abutting against said hub of said one filter element.

8. In a filter device as defined in claim 1, said filter elements being hollow, and said shaft having an internal passage communicating with the interior of said filter elements for receiving filtrate therefrom; and outlet means in said shaft exteriorly of said housing and communicating with said passage.

9. In a filter device as defined in claim 3, said coupling means comprising radially aligned axial grooves in an inner surface of said sleeve and an outer surface of said shaft surrounded by said sleeve, respectively, and an elongated key received in said grooves so as to permit relative axial displacement but preclude relative rotational displacement of said sleeve and shaft.

* * * * *